Feb. 26, 1963  J. A. BYWATER  3,078,532
CLAMP
Filed Dec. 28, 1959
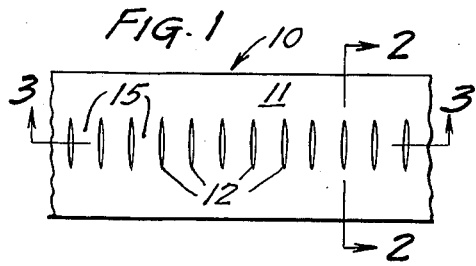
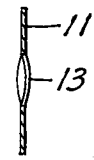
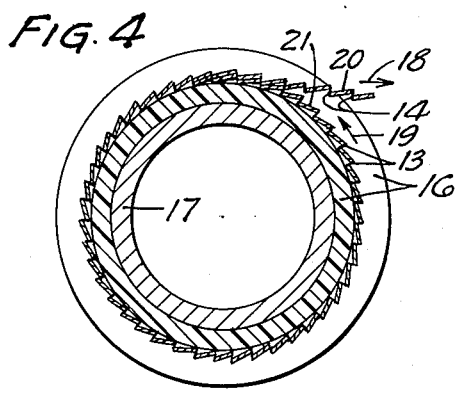
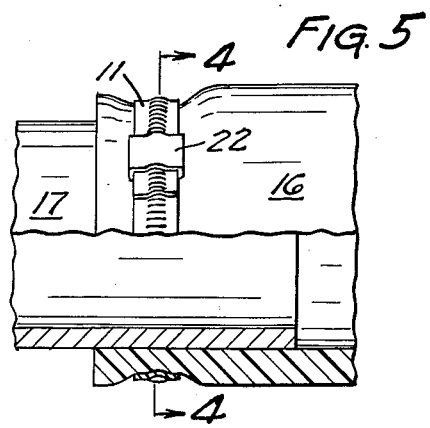
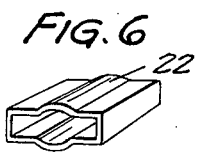
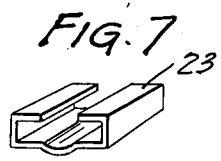
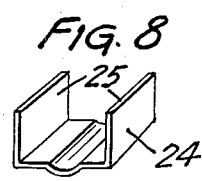
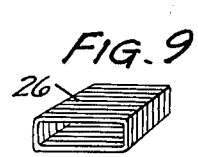
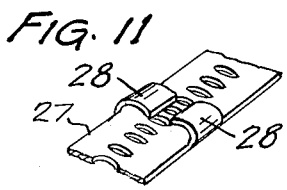
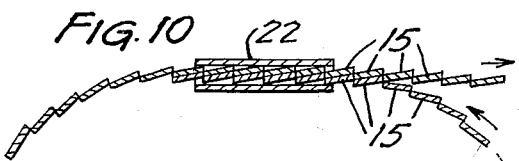
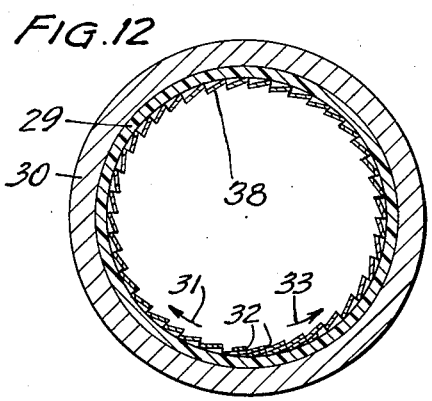
INVENTOR
JOHN A. BYWATER
BY Gilbert B. Gehrenbeck
AGENT United States Patent Office 3,078,532
Patented Feb. 26, 1963

3,078,532
CLAMP
John A. Bywater, Sonnebergstrasse, Reinach, Aargau, Switzerland
Filed Dec. 28, 1959, Ser. No. 862,329
2 Claims. (Cl. 24—22)

This invention relates to clamping devices. While not restricted thereto; the invention is conveniently described in terms of hose clamps as employed, for example, in attaching radiator hose to automobile radiators and engine blocks.

The invention provides a simplified but fully effective clamp means which is produced with a minimum of cutting and forming operations, in continuous lengths applicable to any size of connection. Application is simple. The clamp is easily tightened and provides a strong tight connection, but is quickly and easily removable. Although particularly useful as hose clamps for installation in cramped or difficultly accessible locations, the device of my invention is useful also in the banding or strapping of packing-cases, bundles of pipes or rods, stacks of lumber or metal sheets, and many other articles. Although ordinarily constructed for application under tension, as in the uses previously suggested, my novel clamp device in slightly modified form is also useful under compression, as will be described hereinafter.

I have now found that these and other advantages are secured in a clamp structure comprising simply a stiff, strong, resilient flat strap, for example, a steel strap, uniformly provided along at least a portion of the width of each of its two major surfaces with oppositely facing matching series of projections, together with holding means for resiliently retaining the contiguous surfaces of the ends of a circularly disposed segment of said strap in close contacting relationship.

The structure will now be more particularly described and illustrated in conjunction with the appended drawing, in which—

FIGURE 1 is a plan view of a segment of a preferred strap member, and FIGURES 2 and 3 are end and side elevation sectional views thereof taken at sections 2—2 and 3—3 respectively;

FIGURES 4 and 5 are end and side elevations, mainly in section, of a portion of a hose and pipe connection prepared with a clamp member according to the invention.

FIGURES 6-9 are views in perspective representing various alternative resilient holding means, FIGURE 10 is an enlarged partial longitudinal sectional view of a holding means applied to the contiguous ends of a clamp member, FIGURE 11 is a perspective view of a segment of an alternative one-piece clamp structure, and FIGURE 12 represents in sectional end plan view the application of another form of the clamp member to the inner surface of a compressible hose within an encircling band or pipe.

In a specific illustrative embodiment, the strap member 10 of FIGURE 1 is made of a steel strap 11 which is 10 mm. in width and about 0.3 mm. in thickness. The strap is partially slit and deformed at regular intervals along a central area to provide a series of offset projections along each face. The slits 12 are 2 mm. apart and their length is approximately one-third the width of the strap 11, i.e. about 3-4 mm. Conveniently, the slits are formed and the strap metal is offset concurrently by stamping with a circular die having a diameter of 14 mm. Identical offsetting, but on opposite faces of the strap, is provided at each slit area, thereby producing oppositely facing projections 13 and 14 as shown in FIGURE 3. These projections centrally extend the full thickness of the strap 11 beyond the initial plane of the strap surface, and are arcuate as indicated in FIGURE 2.

The specific form, position, dimension and spacing of the oppositely facing projections may be widely varied without departing from the spirit of my invention, the foregoing being illustrative only. For clamping large articles, the spacing between projections is ordinarily increased; conversely, very small clamps will have more projections per unit length. The slits 12 may extend across more or less of the width of the strap 11 and need not be centrally positioned, although the specific arrangement shown in FIGURE 1 is ordinarily preferred as providing maximum strength with minimum dimensions. The deformed strap segment 15 between adjacent slots is conveniently of flat central section as illustrated, but may be formed to other configuration, for example in extended S shape, by appropriate modification of the die. With thicker strap members, reduced offsetting may still provide adequate strength, although the amount above indicated is preferred in most instances. The projections 13, 14 may be arcuate, i.e. formed with a circular die, or of semi-elliptical or other configuration. In all instances, however, the projections are equidistant from each other and are so arranged that those on one side of the strap will inter-connect with those on the opposite side when the strap is turned back on itself in forming a clamp.

FIGURES 4 and 5 illustrate the strap member 10 applied as a clamp around a compressible hose 16 fitting over a metal pipe 17. In FIGURE 4, arrows 18 and 19 indicate the application of force to the strap ends 20 and 21 respectively, whereby the end 20 slides freely over the end 21 in forming a tight connection but is prevented by the interlocking projections from loosening when force is no longer applied. The hose 16 is thereby effectively compressed and tightly retained against the pipe 17. In FIGURE 5, a resilient retaining ring 22 is applied around the interlocking ends of the strap 11, thus preventing disengagement thereof.

The ring 22, further illustrated in FIGURE 6, is in cross-section in the form of a rectangle having two major centrally oppositely bulged faces, and will be seen to fit snugly over the interlocking ends of the strap member 10. The combination of ring and strap is sufficiently loose and resilient, however, to permit the strap ends to slide over each other in the one direction, while still preventing them from disengaging and releasing.

Additional forms of retaining rings are illustrated in FIGURES 7-9. The pre-formed ring 23 of FIGURE 7 is somewhat more easily manufactured than the ring 22 but must likewise be applied over the two ends of the strap 11. The retaining member 24 of FIGURE 8, on the contrary, may be applied beneath the previously positioned interlocking strap-ends, for example just prior to placing the clamp under tension, and the extended ears 25 pressed or pounded into the closed position after the clamp has been tightened. The ring 26 of FIGURE 9 is formed of spring-wire closely wound. As with ring 22, the ring 26 must be slipped over the ends of the strap member prior to application as a clamp; but ring 26 has the added advantage of flexibility, permitting close accurate conforming to the interlocking strap ends regardless of the diameter of the hose or other article to which the clamp is to be applied. For specific clamp diameters, rings 22 and 23 may of course also be suitably curved.

FIGURE 10 illustrates on somewhat larger scale the interlocking position of the strap-ends and the oppositely facing projections thereof when held in position by a suitable retaining member. The springiness of the ring 22 and the segments 15 of the strap member 10 is sufficient to permit forcing the two strap-ends past each other when stress is applied thereto in the direction indicated by the arrows, since the inclined surfaces of the segments 15 inter-act to compress the projections and expand the ring. In the opposite direction, no such interaction is provided, and the clamp is effectively prevented from loosening.

Where the retaining members 22, 23, 24 and 26 are separate and must be applied to the strap member before or during the clamping operation, the modification illustrated in FIGURE 11 is self-contained. The strap member 27, otherwise corresponding to strap member 10 of FIGURE 1, is provided with extended edge portions 28 which in completing a clamp are forced against the outer surface of the cooperating end of the strap and hold the latter resiliently against the intervening strap segment.

FIGURE 12 illustrates an alternative application in which a strap member 38 is placed under compression within a compressible hose fitting within a rigid pipe 30. Although the structure is substantially the same as described in connection with the strap member 10, the strap 38 is significantly thicker and more sturdy, so that as the interlocking overlapping ends are forced in the direction of the arrows, no buckling occurs. The strength and resiliency of the strap 38 is also sufficient to hold the overlapping ends in interlocking relationship in the absence of a retaining ring, although such a ring may be included if desired.

Clamps formed and applied in accordance with the foregoing may be removed by cutting the strap member or by opening the retaining ring, where used, and then separating the ends of the strap member. Alternatively a ring such as ring 22 may be forcefully slid past the free end of the strap member, e.g. using an appropriate hook-shaped implement, thus to permit separation of the interlocking ends and removal of the strap.

Application of my novel clamping means is effectively accomplished with the simplest of tools. In the embodiment shown in FIGURE 4, for example, the end 20 may be pulled in the direction of arrow 18 by means of pliers, or by suitable edged means contacting projections 14, while the end 21 is simultaneously held in place by force applied in the direction of arrow 19 with a screwdriver against a projection 13. Special tools for applying stress in the same manner are somewhat more convenient but not essential. In the form described in connection with FIGURE 12, the strap 38 may conveniently be provided with a series of holes or slots or other means for applying stress indicated by arrow 31 where normal friction of the strap against the hose 29 is insufficient to prevent sliding as stress 33 is applied against projections 32; or the strap may be loosely inserted and then expanded to final diameter by radial stress simultaneously applied along the entire strap member.

What is claimed is as follows:

1. A clamp member comprising a stiff, strong, resilient metal strap of uniform width and thickness, said strap being slit along a series of equally spaced transverse lines forming a centrally disposed path along the entire length of said strap, said strap being flat on either side of said centrally disposed path, the segments of said strap between said slit lines being equally offset in opposite directions at opposite edges of each slit approximately equal to the thickness of the strap whereby, when the strap is formed into a closed loop with one end superimposed over and retained against the other end, said one end fits in mating relationship against said other end to lock the said ends against slippage in one circumferential direction while permitting sliding ratchet movement in the other circumferential direction.

2. A clamp member comprising: a stiff, strong, resilient metal strap of uniform width and thickness, said strap being slit along a series of equally spaced transverse lines each equal in length to approximately one-third the width of said strap and forming a centrally disposed path along the entire length of said strap, said strap being flat on either side of said centrally disposed path, the segments of said strap between said slit lines being equally arcuately offset in opposite directions at opposite edges of each slit approximately equal to the thickness of the strap, said strap being formed into a closed loop with one end superimposed over and in mating relationship with the other end; and resilient retaining means around said superimposed end portions for resiliently holding said end portions in said mating relationship to lock the said end portions against slippage in one circumferential direction while permitting sliding ratchet movement in the other circumferential direction.

References Cited in the file of this patent

UNITED STATES PATENTS

| | | |
|---|---|---|
| 1,084,407 | Deist | Jan. 13, 1914 |
| 1,173,998 | Depew | Feb. 29, 1916 |
| 1,804,725 | Walker | May 12, 1931 |
| 1,936,909 | MacChesney | Nov. 28, 1933 |
| 2,199,198 | Girvan | Apr. 30, 1940 |
| 2,249,764 | Hothersill | July 22, 1941 |
| 2,268,339 | Leslie | Dec. 30, 1941 |
| 2,746,601 | Rebichon | May 22, 1956 |